United States Patent
Sherwood et al.

(10) Patent No.: US 9,934,000 B2
(45) Date of Patent: Apr. 3, 2018

(54) BALANCING CONSUMPTION OF RANDOM DATA

(71) Applicant: International Business Machines Corporation, Armonk, NY (US)

(72) Inventors: David Sherwood, Manchester (GB); James William Walker, Manchester (GB); Travis Walton, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 13/906,056

(22) Filed: May 30, 2013

(65) Prior Publication Data
US 2013/0325918 A1    Dec. 5, 2013

(30) Foreign Application Priority Data

May 30, 2012    (GB) .................................. 1209550.1

(51) Int. Cl.
*G06F 7/58*    (2006.01)

(52) U.S. Cl.
CPC ............... *G06F 7/58* (2013.01); *G06F 7/588* (2013.01)

(58) Field of Classification Search
CPC ................................ G06F 7/586; G06F 7/588
USPC ...................... 708/250–256; 718/1
See application file for complete search history.

(56) References Cited

U.S. PATENT DOCUMENTS

| | | |
|---|---|---|
| 7,571,199 B1 | 8/2009 | Field et al. |
| 2004/0098429 A1 | 5/2004 | Crispin et al. |
| 2008/0263117 A1* | 10/2008 | Rose ................. G06F 7/582 708/254 |
| 2009/0327700 A1 | 12/2009 | Blade et al. |
| 2010/0002877 A1* | 1/2010 | Zhang .............. 380/46 |
| 2010/0106756 A1 | 4/2010 | Ellison |
| 2010/0306296 A1 | 12/2010 | Inglett et al. |
| 2010/0332574 A1* | 12/2010 | Herbert et al. ...... 708/251 |
| 2011/0047545 A1 | 2/2011 | Ellison et al. |

(Continued)

OTHER PUBLICATIONS

G. Chindris et al., "High-entropy random number generators using system on chip devices," IEEE Xplore, Electronics Technology, 2008, ISSE '08, 31st International Spring Seminar, May 7-11, 2008.

*Primary Examiner* — Andrew Caldwell
*Assistant Examiner* — Emily E. Larocque
(74) *Attorney, Agent, or Firm* — Roy W. Truelson; James R. Nock

(57) ABSTRACT

An apparatus for balancing consumption of random data, comprising an entropy manager operable to: responsive to receipt of a request for random data, monitor one or more events associated with a plurality of entities and access one or more rules; determine whether a higher level of entropy associated with the random data is required by analyzing the one or more events in accordance with the one or more rules; responsive to a determination that a higher level of entropy is not required, set an entropy state associated with the entropy to a lower level of entropy and obtain random data from an entropy source having a lower level of entropy; and responsive to a determination that a higher level of entropy is required, switch an entropy state associated with the entropy to a higher level of entropy and obtain random data from an entropy source having a higher level of entropy.

20 Claims, 5 Drawing Sheets

(56) References Cited

U.S. PATENT DOCUMENTS

2011/0191399 A1  8/2011  Johnston et al.
2011/0302232 A1  12/2011 Vasyltsov et al.

* cited by examiner

BALANCING CONSUMPTION OF RANDOM DATA

FIELD OF THE INVENTION

The present invention relates to an apparatus for balancing consumption of random data.

BACKGROUND OF THE INVENTION

Random numbers are often used in generating appropriate security parameters in a computer system. In some computer systems, entropy is added to a system that generates random numbers in order to generate differing sequences of random numbers. Entropy is a measure of the uncertainty associated with a random number. Further, entropy is a useful measurement for data used in seeding a random number generator, wherein typically, a high level of entropy leads to a stronger random number generator.

Often, data with a high level of entropy is a scarce resource. For example in some systems, high entropy data requires time to gather; e.g., by monitoring a network or disk. This means that if there is a demand for high entropy data there can sometimes be a delay whilst data is gathered to meet the demand.

Generally speaking, server virtualization describes a software abstraction that separates a physical resource and its use from the underlying physical machine. Most physical resources, such as processors, storage devices, and network adaptors, can be abstracted and provisioned as virtualized entities.

Virtual machines (VMs) play a central role in server virtualization. A VM is a virtualization of a physical machine and its hardware components. A VM typically includes a virtual processor, a virtual system memory, and various virtual devices. A single physical machine can host multiple VMs. Guest operating systems can be executed on VMs and function as though executing on actual hardware of a physical machine.

A hypervisor or virtual machine manager provides an interface between VMs and the underlying hardware of a physical machine. By multiplexing all accesses to the underlying hardware among various VMs, a hypervisor guarantees various VMs the usage of the actual hardware, such as processors, system memory, etc., of the physical machine.

FIG. 1 depicts a block diagram of a prior art system (100) comprising a server computer (105) having a number of VMs (110, 120 and 130) each associated with a secure function; e.g., a virtual Trusted Platform Module (VTPM) (115, 125 and 135) as specified by the Trusted Computing Group (TCG) wherein trust within a system or trust between a system and another entity is based on a VTPM. The server (105) supports a hypervisor (140), wherein a virtual machine and its associated VTPM is powered-on by the hypervisor (140). The server (105) also comprises an entropy pool (145) comprising the data used in seeding a random number generator associated with each VTPM. The random generator is used for e.g., RSA key generation and nonces for communications. The hypervisor provides an interface between VMs (110, 120 and 130) and the underlying hardware of a physical machine (150), which includes processors (155) and system memory (160).

When a VM is required to start, the hypervisor (140) begins boot of the VM (e.g., a first VM (110)) and its associated VTPM (e.g., a first VTPM (115)). The first VTPM (115) begins its initialization and performs self-test routines (e.g., self-tests of its algorithms, such as, ensuring that it can generate an RSA key) as part of the initialization, reporting the results of its self-tests to its associated first VM (110) at the request of the first VM (110).

With reference to FIG. 2, as part of the first VTPM's (115) self-test, the first VTPM (115) invokes TPM emulation software (200) to self-test. TPM emulation software (200) of the first VTPM (115) executes routines associated with cryptographic support software (205) in order to complete its self-test. Before the cryptographic support software (205) can begin execution, the cryptographic support software (205) must also initialize. As part of the initialization, data from the entropy pool (145) is required to be loaded such that the routines associated with cryptographic support software (205) can be executed. VTPMs require a good quality seed to ensure that the random numbers generated are of high-quality to prevent certain types of attack.

The cryptographic support software (205) makes a request for the data by contacting the hypervisor (140). In response to receiving the request, the hypervisor (140) checks the entropy pool (145) to determine whether the entropy pool (145) contains enough data having a high level of entropy. If the entropy pool (145) does not contain enough data having a high level of entropy, a delay occurs whilst data is gathered to replenish the entropy pool (145). If the entropy pool (145) does contain enough data, the hypervisor (140) returns data to the cryptographic support software (205) such that the data can be used as a seed for a random generator, and the resulting random number can be used for the routines associated with cryptographic support software (205). The cryptographic support software (205) can complete its self-test and control is returned to the TPM emulation software (200) which continues processing—during this processing, the TPM emulation software (200) can make further calls to the cryptographic support software (205) in order to test further cryptographic functions, that is, the TPM emulation software (200) can continue to determine whether it can service (when requested) the first VM (110). Once such processing is complete, the TPM emulation software (200) is operable to record self-test data in an internal status area which can be retrieved when the first VM (110) makes contact. When the components of the first VTPM (115) have finished their self tests, the first VTPM (115) awaits contact from the first VM (110).

It should be understood that if several VMs power-on at once (and thus, if several associated VTPMs also boot at once), each VTPM will need to consume data from the entropy pool. This may starve the entropy pool, resulting in one or more of the VTPMs stalling, waiting for the data to be replenished—this in turn halts the boot of a stalled VTPM's associated VM. As it may take several seconds or even several minutes to replenish the entropy pool, this delay may be unacceptable to enterprises.

SUMMARY OF THE INVENTION

According to one embodiment, there is provided an apparatus for balancing consumption of random data, comprising an entropy manager operable to: responsive to receipt of a request for random data, monitor one or more events associated with a plurality of entities and access one or more rules; determine whether a higher level of entropy associated with the random data is required by analyzing the one or more events in accordance with the one or more rules; responsive to a determination that a higher level of entropy is not required, set an entropy state associated with the entropy to a lower level of entropy and obtain random data from an entropy source having a lower level of entropy; and responsive to a determination that a higher level of entropy is required, switch an entropy state associated with the entropy to a higher level of entropy and obtain random data from an entropy source having a higher level of entropy.

According to another aspect of the embodiment, there is provided a method for balancing consumption of random data, comprising the steps of: monitoring, in response to receipt of a request for random data, one or more events associated with a plurality of entities; accessing one or more rules; determining whether a higher level of entropy associated with the random data is required by analyzing the one or more events in accordance with the one or more rules; setting, in response to a determination that a higher level of entropy is not required, an entropy state associated with the entropy to a lower level of entropy and obtaining random data from an entropy source having a lower level of entropy; and switching, in response to a determination that a higher level of entropy is required, an entropy state associated with the entropy to a higher level of entropy and obtaining random data from an entropy source having a higher level of entropy.

According to another aspect of the embodiment, there is provided a computer program comprising program code means adapted to perform all the steps of the method above when said program is run on a computer.

BRIEF DESCRIPTION OF THE DRAWINGS

The present invention will now be described, by way of example only, with reference to embodiments thereof, as illustrated in the following drawings.

DETAILED DESCRIPTION

Figure 1:
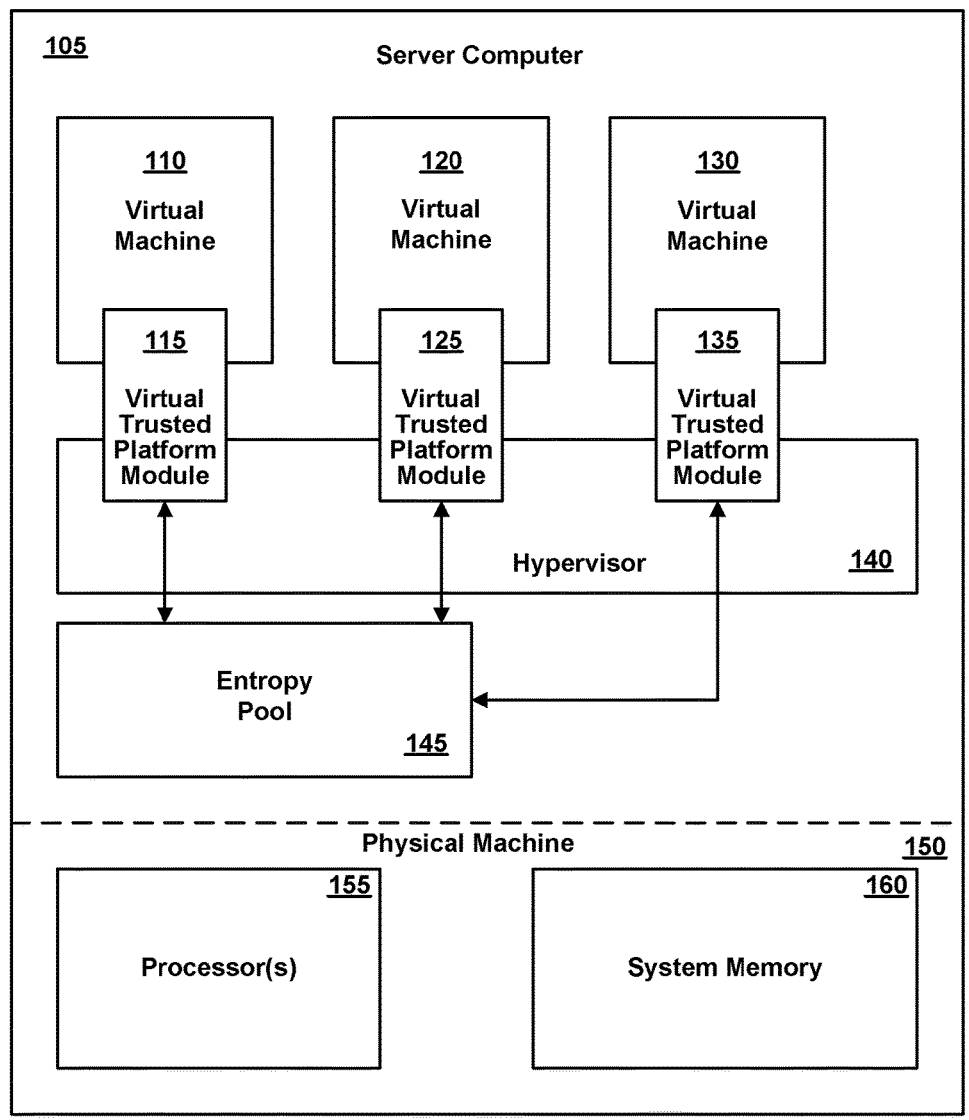
FIG. 1 depicts a block diagram of a virtualised system according to the prior art.
Figure 2:
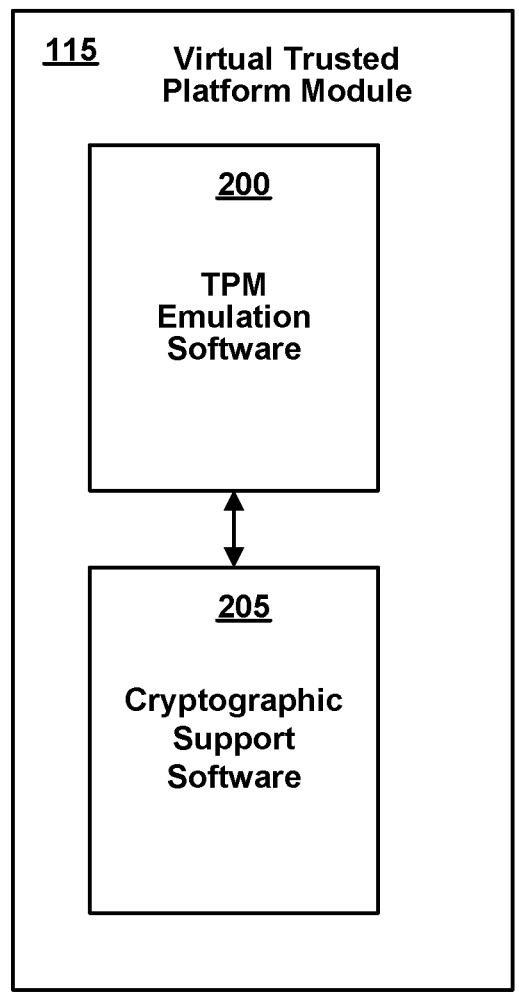
FIG. 2 depicts a block diagram of a VTPM according to the prior art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
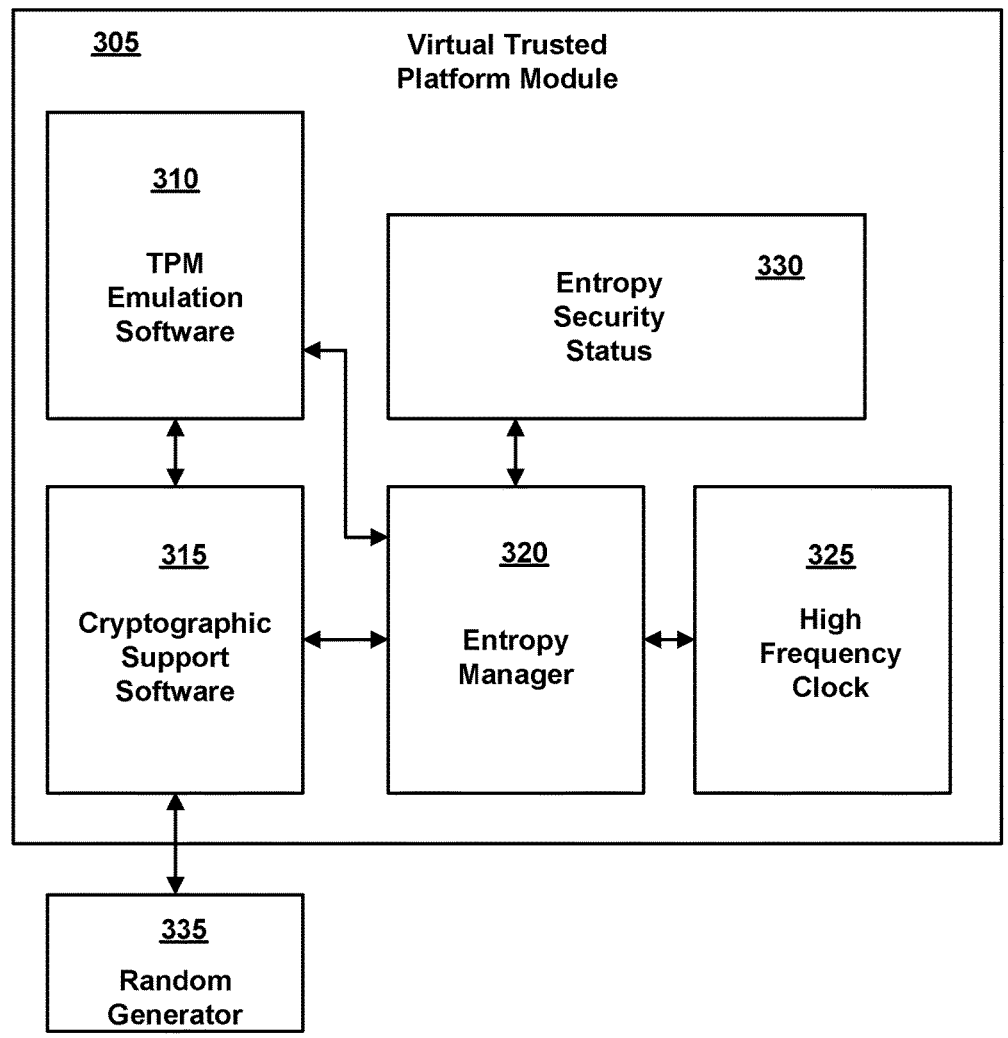
FIG. 3 depicts a block diagram of a VTPM according to an embodiment.

FIG. 3 depicts a block diagram of a VTPM (305) according to an embodiment. The VTPM (305) comprises TPM emulation software (310); cryptographic support software (315); an entropy security status (330); an entropy manager (320) and a high frequency clock (325). The VTPM is associated with system (not shown) comprising an associated VM; a hypervisor; an entropy pool; and a random generator (335).

Figure 4:
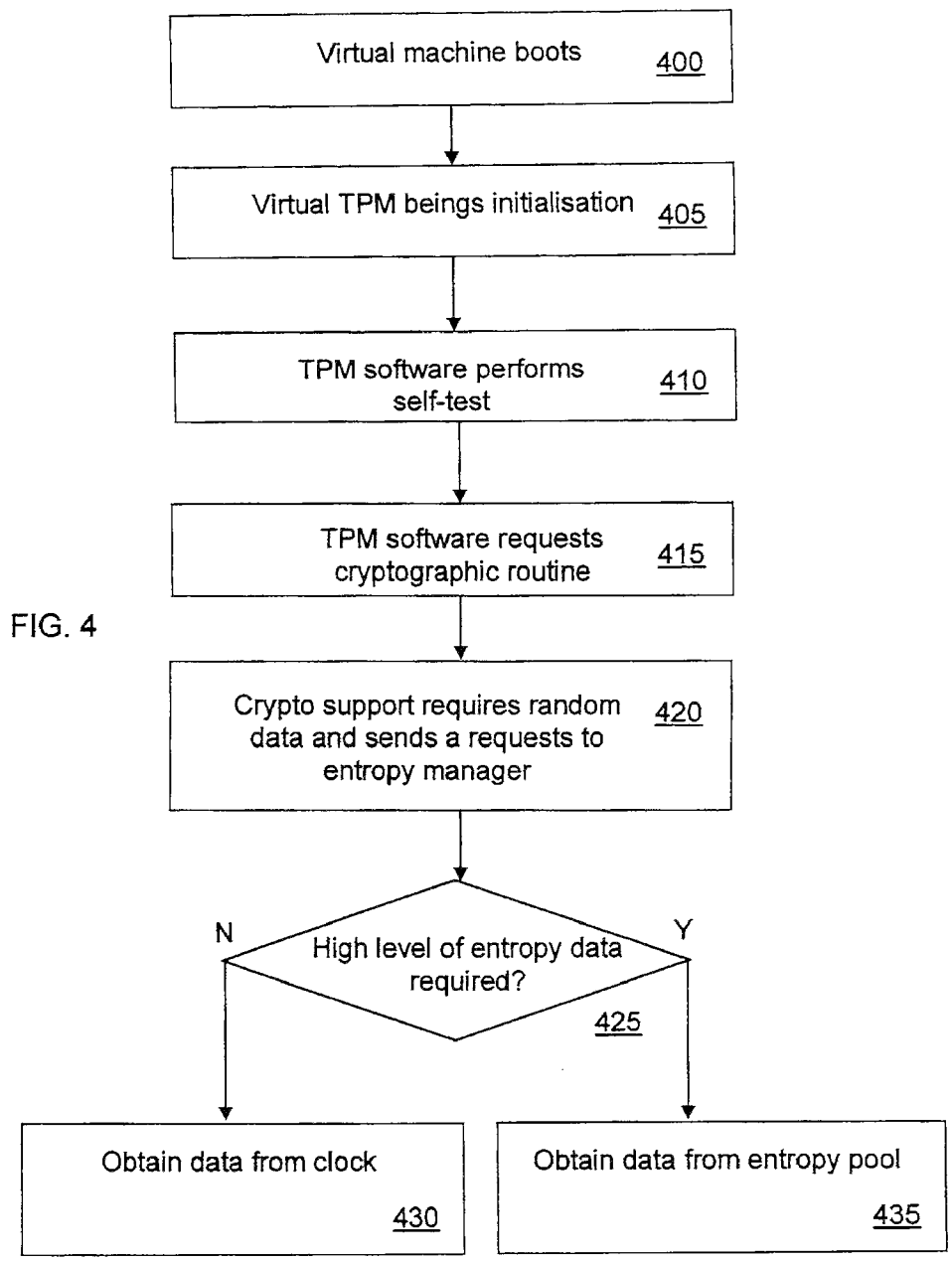
FIG. 4 is a flow chart showing the operational steps involved in a process associated with VTPM initialization according to the embodiment.

A process according to an embodiment will now be described with reference to FIGS. 3 and 4.

At step 400, a VM begins booting and causes initialization (step 405) of the associated VTPM (305). The VTPM (305) must perform initialization of its own local encryption systems (e.g., it must test that a key can be generated) and if any errors occur, the errors are flagged to the VM when the VM asks for the result and/or the VM tries to use the VTPM—the flagging should occur promptly. As part of the VTPM (305) initialization, at step 410, the TPM emulation software (310) performs a self-test and in order to do so, requests (step 415) a cryptographic routine associated with cryptographic support software (315).

Before the cryptographic support software (315) can begin execution, the cryptographic support software (315) must also initialize. As part of the initialization, data from the entropy pool is required to be loaded such that the routines associated with cryptographic support software (315) can be executed. The cryptographic support software (315) requests such data from the entropy manager (320).

At step 425, the entropy manager (320) determines whether data with a high level of entropy is required (step 425 will be described in more detail herein). If a high level of entropy is not required, the entropy manager (320) obtains (step 430) data from the high frequency clock (325) and returns the data to the cryptographic support software (315). As discussed in the background section, the data can be used as a seed for a random generator and the resulting random number can be used for the routines associated with cryptographic support software (315). The cryptographic support software (315) can complete its self-test and control is returned to the TPM emulation software (310) which continues processing. When the components of the first VTPM (115) have finished their self tests, the first VTPM (115) awaits contact from the first VM (110).

If a high level of entropy is required, the entropy manager (320) obtains (step 435) data from the entropy pool and returns the data to the cryptographic support software (315).

A more detailed discussion of entropy levels will now be given.

With regards to the "level" of entropy, a level represents how uncertain/unpredictable the associated data is. This is because as a computer is a mechanical and predictable system, it is difficult for a computer to generate random data and in general, a person skilled in the art would term this data pseudo-random.

A clock reading can be used as data for seeding a random number generator. Although the random number generator appears to generate random numbers, the random number generator will generate the same sequence of numbers for a particular seed value. Thus, typically, a clock is read and used to seed the random number generator for a given rule; e.g., wherein a rule comprises: for every 200 bytes of random data generated, re-seed the random number generator by reading the clock. As such, if the same computer program runs on two computers and the program reads the clock, it is difficult to predict the returned value. However, if the data from the clock was used in a security system (e.g., in order to generate a key for encryption), this can lead to a weakness in that although data returned from the clock may appear to be un-predictable, an attacker would know that its value falls within a particular range and thus, such data is predictable to a degree, that is, it has low entropy.

High-entropy data is difficult for a computer to generate and thus, modern systems use techniques such as monitoring network as traffic in order to generate data as such data is generally difficult to predict (certainly on busy networks). However, it takes time in order to gather such random data, maybe seconds, maybe minutes because the system needs to waits for enough random events to occur. In more detail, the governing principle in a network monitoring technique is that on a busy computer network, traffic that is flowing on the wire is unpredictable. For example a laptop and a number of other computer systems that are connected to a network are operable to send messages between each other—when a message will be sent and what message content is being sent is difficult to predict; e.g., it is difficult to predict when a user of such a system will send an e-mail; access the Internet; transfer a file etc. As such, a computer system connected to the network can monitor passing traffic and record data about associated messages; e.g., a time of sending; a type of message; size of the message. The data is added to a pool of entropy and after some time has passed, the entropy pool increases and it becomes difficult for an attacker to predict its content.

Note that other events which are difficult to predict can also be monitored in addition to network events. For example, a hard-disk is a mechanical spinning device and thus, has some level of associated variability. Further, two different computer systems can have different data layouts meaning that data access times can be difficult to predict. As such, a computer system can time how long it takes each hard disk-read to return data. Such additional unpredictable data can also be added to the entropy pool.

The reason that the gathering of such random data can take time is that the technique depends upon the busyness of events. For example, if a given system uses a rule whereby one thousand network packets are monitored in order to generate one hundred bits of entropy data, if an entropy pool is empty and a request is made of the pool for one hundred bits of entropy data, the system will force a delay until one thousand network packets have been monitored such that the entropy pool can be replenished. The delay may be fairly small or fairly large depending on the local network conditions.

Step 425 will now be described in more detail with reference to FIG. 5. In order to determine whether data with a high level of entropy is required, the entropy manager (320) monitors a message connection between the VTPM (305) and its VM for a period of time and accesses a number of associated rules in a rule base which is depicted below. Each rule comprises an event associated with the monitoring and an entropy level associated with an event:

TABLE 1

| Event | Entropy level |
| --- | --- |
| 1. VM sends no message | Low |
| 2. VM sends message but message does not indicate need for secure operations | Low |
| 3. VM sends message and message indicates need for secure operations | High |

Figure 5:
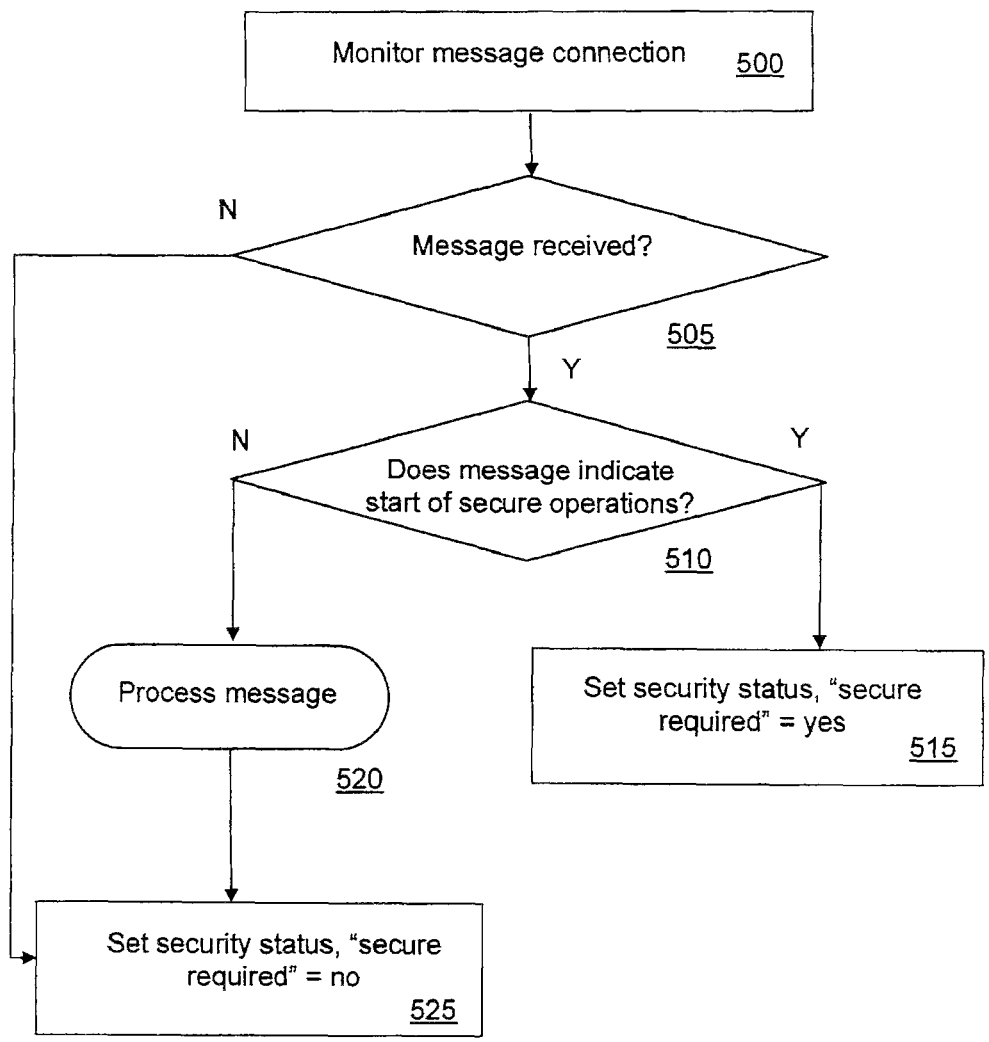
FIG. 5 is a flow chart showing the operational steps involved in a process associated with entropy level switching according to the embodiment.

At step 500 in FIG. 5, the entropy manager (320) monitors a message connection between the VTPM (305) and its VM—a VM is operable to send a message to the VTPM (305); e.g., to the TPM emulation software (310).

At step 505, the entropy manager (320) determines whether the VTPM (305) has received a message. If the VTPM (305) has not received a message, the entropy manager (320) checks the rule base in order to determine an associated entropy level with such event and determines that the entropy level, according to Rule 1, is low according to a default setting. Rule 1 assumes that because no message is sent, no secure operation (such as, generation of a key for use by the VM) is needed. The entropy manager (320) sets (step 525) or maintains the entropy security status (330) at a level where high entropy is not required—this level is termed a "weak state" herein. With reference to FIG. 4, the entropy manager (320) is operable, in response to the weak state, to obtain data from the high frequency clock (325) and returns the data to the cryptographic support software (315).

If the VTPM (305) has received a message, the entropy manager (320) determines (step 510) whether the message indicates the start of secure operations (e.g., by parsing the message and matching the message to a set of known message content together with metadata indicating whether the known content indicates the start of secure operations). For example, if the entropy manager (320) intercepts a message comprising message content; e.g., "Continue self test" or "Get capabilities", metadata associated with such message content indicates that secure operations are not started as such messages are typically associated with self-testing. For example, during self-test, even if a key is required to be generated, a generated key is discarded once self-test has completed, that is, the key is not used for secure operations.

The entropy manager (320) passes the message to the TPM emulation software (310) which processes (step 520) the message. The entropy manager (320) sets (step 525) or maintains the entropy security status (330) at a level where high entropy is not required. With reference to FIG. 4, the entropy manager (320) is operable, in response to a weak state, to obtain data from the high frequency clock (325) and returns the data to the cryptographic support software (315).

In another example, if the entropy manager (320) intercepts a message comprising; e.g., message content "Create endorsement key" and metadata associated with such message content indicates the start of secure operations. For example, such a message may indicate the generation of an RSA key and the transmission of a public part of the key to an external user. In such a case, the entropy manager (320) sets (step 515) or maintains the entropy security status (330) at a level where high entropy is required—this level is termed a "strong state" herein. With reference to FIG. 4, the entropy manager (320) is operable, in response to a strong state, to obtain data from the entropy pool and returns the data to the cryptographic support software (315).

It should be understood that the entropy security status (330) can be switched to a level where high entropy is required and if switched, the entropy security status (330) should preferably not be flipped back to a level where high entropy is not required because once the entropy manager (320) has identified that the VM is using the VTPM for secure purposes, flipping back to a weak state could compromise security.

In a first implementation, a "getRandomInt" interface for a random generator is modified such that, in response to analyzing one or more rules, the entropy manager (320) can specify whether data seeded from an entropy source having a weak state or a strong state should be obtained. A representation of the associated method (namely, RandomGenerator) is shown below, where the value for variable "source" is Weak or Strong:

int RandomGenerator::getRandomInt(EntropySecurityStatus source);

In a second implementation, a new interface is added to the random number generator algorithm such that in response to analyzing one or more rules, the entropy manager (320) can change the level of the entropy source. A representation of the associated method (namely, RandomGenerator) is shown below, where the value for variable "source" is Weak or Strong:

void RandomGenerator::setRequiredSeedStrength(EntropySecurityStatus source);

In an implementation, the TPM emulation software (310) and the cryptographic support software (315) require no changes in order to function with the embodiment and can remain unaware of the embodiment. Rather, when the TPM emulation software (310) initiates cryptographic routines, it is only at a point where the cryptographic support software (315) requires random data that the function to determine an associated entropy level is executed—this function is preferably isolated from the TPM emulation software (310) and the cryptographic support software (315).

Although two states, namely a strong state and a weak state have been described herein, it should be understood that the present invention can function with any number of states (levels of entropy). For example, a low level of entropy can require that the entropy manager (320) reads four bytes of data from the high frequency clock (325); a medium level of entropy can require that the entropy manager (320) reads two bytes of data from the high frequency clock (325) and two bytes of data from the entropy pool; and a high level of entropy can require that the entropy manager (320) reads four bytes of data from the entropy pool.

The inventors have observed that if several VTPMs are booted at the same time, each VTPM will enter the weak state at approximately the same time. However, the time taken for a VTPM to enter a strong state (that is, the point where a VM begins to use the VTPM in a secure manner) can be variable. Advantageously, the present invention takes into account this observation such that random data having a low entropy level can be generated to satisfy certain requirements but random data having a high entropy level is only consumed when the system requires it. Advantageously, demand for entropy is distributed over time preventing unnecessary stalls as several VTPMs boot and demand to consume random data.

Advantageously, the present invention provides a system and method for balancing computing resource consumption by providing plural qualities of entropy depending on requirements.

Although the embodiment has been described with reference to VMs and associated VTPMs, the present invention can apply to many other software systems that need random data, if such systems are operable to identify whether data having a high entropy level or a low entropy level is required—advantageously, such systems can make more informed decisions about when data from a limited supply is consumed.

The invention claimed is:

1. A digital data apparatus for producing random digital data, comprising:
   at least one physical processor;
   a physical system memory;
   a plurality of entropy sources each generating respective random source digital data having a corresponding level of entropy, including a first entropy source generating random source digital data having a first level of entropy, and a second entropy source generating random source digital data having a second level of entropy lower than said first level of entropy, said second entropy source being independent of said first entropy source;
   a random number generator embodied as computer program code storable in said physical system memory and executable on said at least one physical processor, said random number generator receiving input from each said plurality of entropy sources, said random number generator generating a random digital data output by a deterministic algorithm using input from a selective one of said plurality of entropy sources as a seed for said deterministic algorithm;
   an entropy manager embodied as computer program code storable in said physical system memory and executable on said at least one physical processor, wherein said entropy manager automatically selects one entropy source among said plurality of entropy sources as input for the seed for said deterministic algorithm used by said random number generator, said entropy manager automatically selecting one entropy source among said plurality of entropy sources by determining a minimum level of entropy required by a consuming entity from among multiple possible minimum levels of entropy required, wherein the consuming entity consumes random digital data output by said random number generator to perform at least one data processing function, wherein the minimum level of entropy required by the consuming entity is a minimum level required as input for the seed for said random number generator to produce the random digital data output consumed by the consuming entity, said entropy manager further automatically selecting an entropy source from among said plurality of entropy sources having the lowest corresponding level of entropy which meets said minimum level of entropy required by the consuming entity.

2. The digital data apparatus of claim 1, wherein said entropy manager determines a level of entropy required by monitoring one or more events associated with a plurality of entities which consume random digital data output by said random number generator, accessing one or more rules, and analyzing the one or more events in accordance with the one or more rules.

3. The digital data apparatus of claim 2, wherein said entropy manager monitors one or more events associated with a message connection associated with the plurality of entities.

4. The digital data apparatus of claim 3, wherein responsive to an event indicating that no message is sent using the message connection, the entropy manager determines that a higher level of entropy is not required in accordance with the one or more rules.

5. The digital data apparatus of claim 3, wherein responsive to an event indicating that a message is sent using the message connection and wherein the message does not indicate initialization of a secure operation, the entropy manager determines that a higher level of entropy is not required in accordance with the one or more rules.

6. The digital data apparatus of claim 1, wherein the entropy manager prevents flipping of an entropy selection state to a lower level of entropy if the entropy selection state has been switched to a higher level of entropy.

7. The digital data apparatus of claim 1, wherein the plurality of entropy sources further comprises a third entropy source generating random source digital data having a third level of entropy, the third level being higher than the second level and lower than the first level.

8. A method for producing random digital data in a digital data apparatus, comprising:
   providing, with each of a plurality of entropy sources, respective random source digital data having a corresponding level of entropy to a random number generator, said plurality of entropy sources including a first entropy source providing random digital data having a first level of entropy, and a second entropy source providing random digital data having a second level of entropy lower than said first level of entropy, said second entropy source being independent of said first entropy source;
   automatically selecting, with said digital data apparatus, an entropy source from among said plurality of entropy sources as input for a seed of said random number generator to generate a random digital data output, wherein said automatically selecting is performed by determining a minimum level of entropy required by a consuming entity from among multiple possible minimum levels of entropy required, and selecting an entropy source from among said plurality of entropy sources having the lowest corresponding level of entropy which meets said minimum level of entropy required by the consuming entity, wherein the consuming entity consumes random digital data output by said random number generator to perform at least one data processing function, wherein the minimum level of entropy required by the consuming entity is a minimum level required as input for the seed for said random number generator to produce the random digital data output consumed by the consuming entity; and
   generating, with said random number generator, a random digital data output by applying a deterministic algorithm using the seed selected as input by said automatically selecting an entropy source from among said plurality of entropy sources as input for a seed of the random number generator.

9. The method of claim 8, wherein said automatically selecting an entropy source from among said plurality of entropy sources comprises monitoring one or more events associated with a plurality of entities which consume random digital data output by said random number generator, accessing one or more rules, and analyzing the one or more events in accordance with the one or more rules.

10. The method of claim 9, wherein monitoring one or more events comprises monitoring one or more events associated with a message connection associated with the plurality of entities.

11. The method of claim 10, wherein responsive to an event indicating that no message is sent using the message connection, a determination is made that a higher level of entropy is not required in accordance with the one or more rules.

12. The method of claim 10, wherein responsive to an event indicating that a message is sent using the message connection and wherein the message does not indicate initialization of a secure operation, a determination is made that a higher level of entropy is not required in accordance with the one or more rules.

13. The method of claim 8, wherein the plurality of entropy sources further comprises a third entropy source providing random source digital data having a third level of entropy, the third level being higher than the second level and lower than the first level.

14. A computer program product for producing random digital data, the computer program product comprising a plurality of computer-executable instructions recorded in a non-transitory computer-readable media, wherein said instructions, when executed by at least one computer system, cause the at least one computer system to perform:
receiving, from each of a plurality of entropy sources, respective random source digital data having a corresponding level of entropy in a random number generator, said plurality of entropy sources including a first entropy source providing random digital data having a first level of entropy, and a second entropy source providing random digital data having a second level of entropy lower than said first level of entropy, said second entropy source being independent of said first entropy source;
automatically selecting an entropy source from among said plurality of entropy sources as input for a seed of said random number generator to generate a random digital data output, wherein said automatically selecting is performed by determining a minimum level of entropy required by a consuming entity from among multiple possible minimum levels of entropy required, and selecting an entropy source from among said plurality of entropy sources having the lowest corresponding level of entropy which meets said minimum level of entropy required by the consuming entity, wherein the consuming entity consumes random digital data output by said random number generator to perform at least one data processing function, wherein the minimum level of entropy required by the consuming entity is a minimum level required as input for the seed for said random number generator to produce the random digital data output consumed by the consuming entity; and
generating, with said random number generator, a random digital data output by applying a deterministic algorithm using the seed selected as input by said automatically selecting an entropy source from among said plurality of entropy sources as input for a seed of the random number generator.

15. The computer program product of claim 14, wherein said automatically selecting an entropy source from among said plurality of entropy sources comprises monitoring one or more events associated with a plurality of entities which consume random digital data output by said random number generator, accessing one or more rules, and analyzing the one or more events in accordance with the one or more rules.

16. The computer program product of claim 15, wherein monitoring one or more events comprises monitoring one or more events associated with a message connection associated with the plurality of entities.

17. The computer program product of claim 16, wherein responsive to an event indicating that no message is sent using the message connection, a determination is made that a higher level of entropy is not required in accordance with the one or more rules.

18. The computer program product of claim 16, wherein responsive to an event indicating that a message is sent using the message connection and wherein the message does not indicate initialization of a secure operation, a determination is made that a higher level of entropy is not required in accordance with the one or more rules.

19. The computer program product of claim 14, wherein the plurality of entropy sources further comprises a third entropy source providing random source digital data having a third level of entropy, the third level being higher than the second level and lower than the first level.

20. The digital data apparatus of claim 1, wherein said consuming entity comprises a cryptographic apparatus which uses the random digital data output by said random number generator for performing at least one cryptographic operation on data.

* * * * *